Jan. 1, 1952 C. E. GERMANTON 2,580,757

ALARM SENDING CIRCUIT

Filed Oct. 29, 1948 7 Sheets-Sheet 1

INVENTOR
C. E. GERMANTON
BY P. C. Smith
ATTORNEY

ALARM SENDING CIRCUIT

Filed Oct. 29, 1948 7 Sheets-Sheet 2

INVENTOR
C. E. GERMANTON
BY P. C. Smith
ATTORNEY

INVENTOR
C. E. GERMANTON
BY P. C. Smith
ATTORNEY

Jan. 1, 1952

C. E. GERMANTON 2,580,757

ALARM SENDING CIRCUIT

Filed Oct. 29, 1948

7 Sheets-Sheet 4

INVENTOR
C. E. GERMANTON
BY P. C. Smith
ATTORNEY

Jan. 1, 1952 C. E. GERMANTON 2,580,757

ALARM SENDING CIRCUIT

Filed Oct. 29, 1948 7 Sheets-Sheet 5

INVENTOR
C.E. GERMANTON
BY P. C. Smith
ATTORNEY

Jan. 1, 1952 C. E. GERMANTON 2,580,757

ALARM SENDING CIRCUIT

Filed Oct. 29, 1948 7 Sheets-Sheet 6

INVENTOR
C. E. GERMANTON
BY P. C. Smith
ATTORNEY

INVENTOR
C.E. GERMANTON
BY
P. C. Smith
ATTORNEY

Patented Jan. 1, 1952

2,580,757

UNITED STATES PATENT OFFICE 2,580,757

ALARM SENDING CIRCUIT

Charles E. Germanton, Summit, N. J., assignor to Bell Telephone Laboratories, Incorporated, New York, N. Y., a corporation of New York Application October 29, 1948, Serial No. 57,392

18 Claims. (Cl. 179—27)

Figure 1:
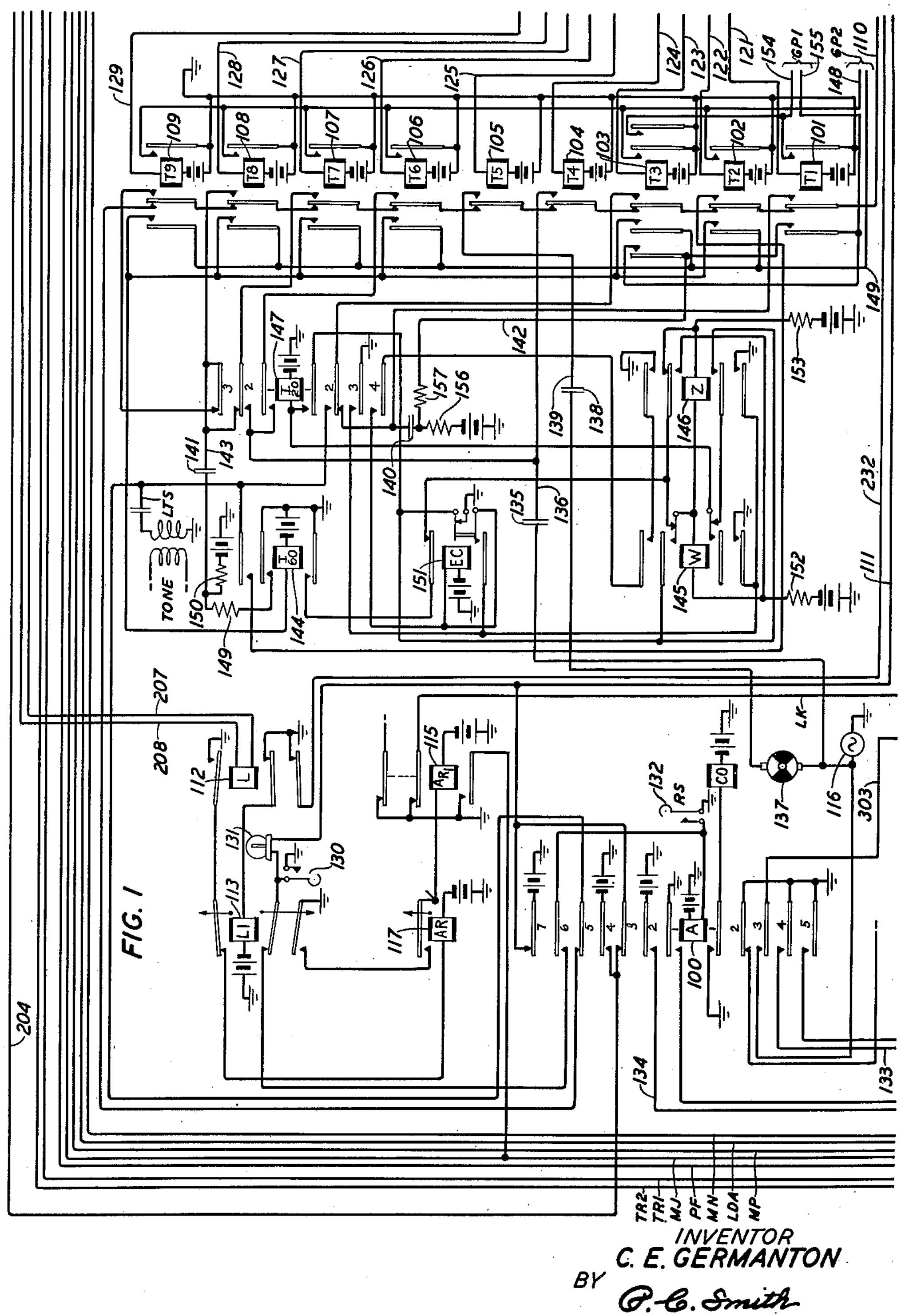

This invention relates to telephone systems in which connections between subscribers' lines are established by automatic switching equipment and more particularly to signaling equipment by which signals concerning circuit, apparatus or power failures at an unattended office of an exchange area may be selectively transmitted to an attended office of the area.

The invention is not limited in its application to any specified type of exchange system but may, for example, be applied to a cross bar system of the type disclosed in the application of A. J. Busch Serial No. 57,394 filed concurrently herewith. The invention is also applicable to any signaling system in which it is desirable to transmit a large number of distinct signals in a simple and efficient manner from a remote point to a station where such signals may be utilized for supervisory or information purposes.

In a telephone system in which an exchange area is subdivided into a plurality of offices, some of such offices may be located on the fringes of the exchange area and unless such offices serve large groups of subscribers' lines, it is not expedient or necessary to provide maintenance crews continuously therein. Such offices are, therefore, classified as unattended with respect to maintenance. There may also be several offices serving the more congested portion of the exchange area which may for convenience and economy be located in a single office building. In such a case, a single maintenance force may serve all of the offices in the same building but be normally in attendance in one of such offices. In that case the other offices in the building would in effect be unattended.

In any case where an office is unattended it is essential to the maintenance of service that, when trouble of any kind arises in the office, service shall be restored or the trouble remedied as soon as possible by the dispatch of a maintenance man or crew familiar with the equipment which is in trouble and thus best trained to cope with the situation. It is thus most desirable that information be available at the central maintenance station or office concerning not only the general nature of the trouble but also the specific nature thereof.

It is therefore the object of the present invention to provide signaling equipment simple in construction, efficient in operation and economical in installation which is capable of transmitting signals from an unattended office to a central attended office indicative of the general nature and of the specific nature of any trouble arising at the unattended office.

It is a further object of the invention to enable a large number of distinctive signals to be transmitted from one point to another over a two-conductor circuit by the utilization of combinations of lamp and tone signals.

These objects are attained, in accordance with the present invention, by the provision of means for transmitting direct current code signals over the tip or ring conductors of a signaling or trunk circuit extending from a remote unattended station to an alarm receiving station indicative of a plurality of general classes of trouble which may arise at the remote station such as for example as may arise in an unattended office of a telephone exchange system equipped with switching equipment of the cross bar type. These general classes of trouble might for example be a failure of a marker to accomplish its functions on a first trial seizure thereof giving rise to a minor trouble record; failure of a marker to accomplish its functions on a second trial seizure thereof giving rise to a major trouble record; a minor power failure; a major power failure; a minor equipment or circuit trouble; a permanent signal alarm condition or an excessive traffic condition. For the general classes of trouble distinctive lamp signals are given at the alarm receiving station.

To more specifically identify any one of the general classes of trouble, the remote station is arranged to transmit any one of a plurality of distinctive tone signals to the alarm receiving station. To economize in equipment when the invention is applied to a telephone system, the ringing and tone generation equipments of the remote office are utilized. It is thus possible to transmit ten distinctive tone signals as for example: continuous low tone; high speed battery clicks; interrupted low tone; battery clicks and low tone; continuous ringing tone; machine ringing tone; intermittent ringing tone; battery clicks and continuous ringing tone; low speed battery clicks and battery clicks followed by a silent interval.

Figure 2:
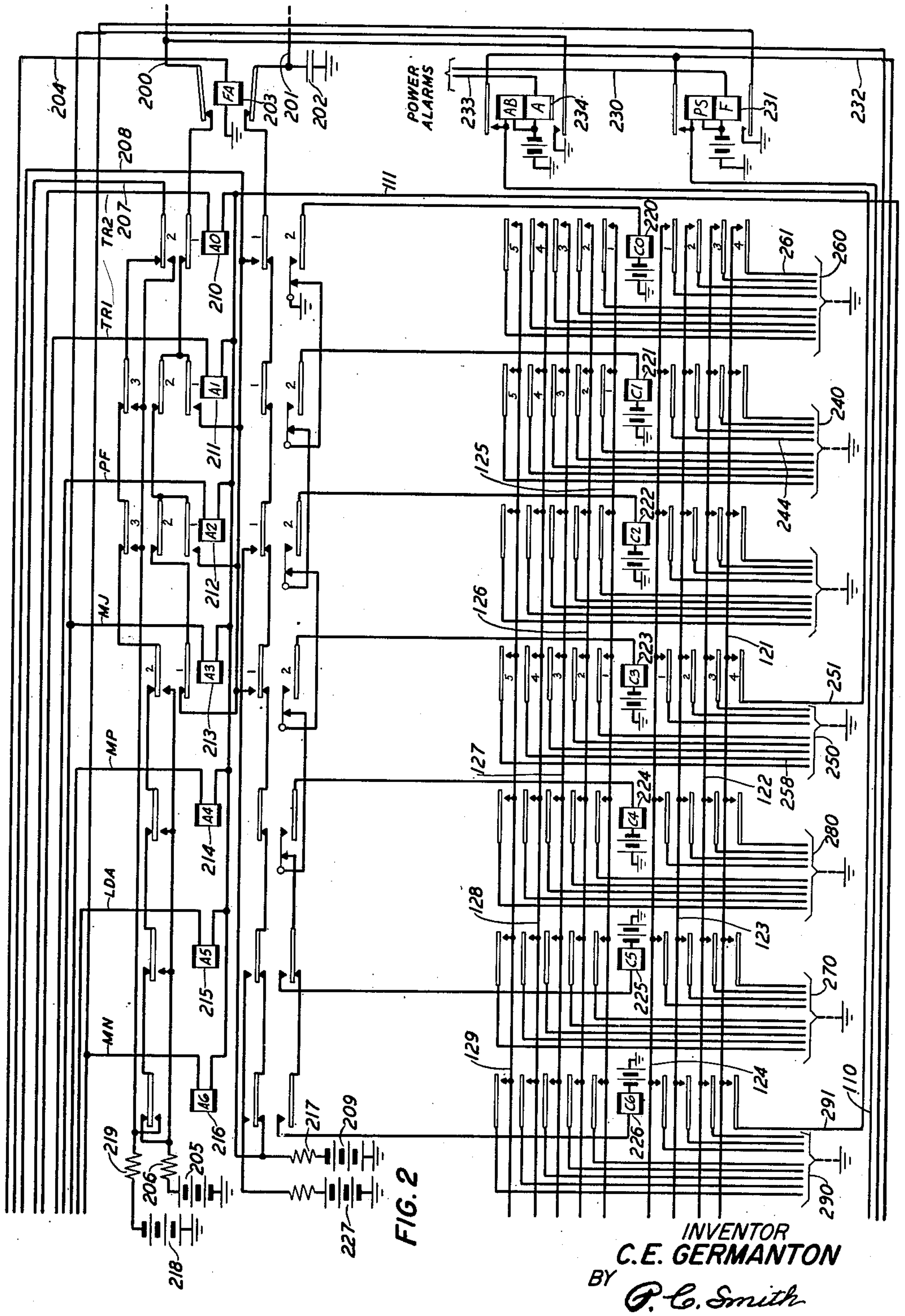
Figure 3:
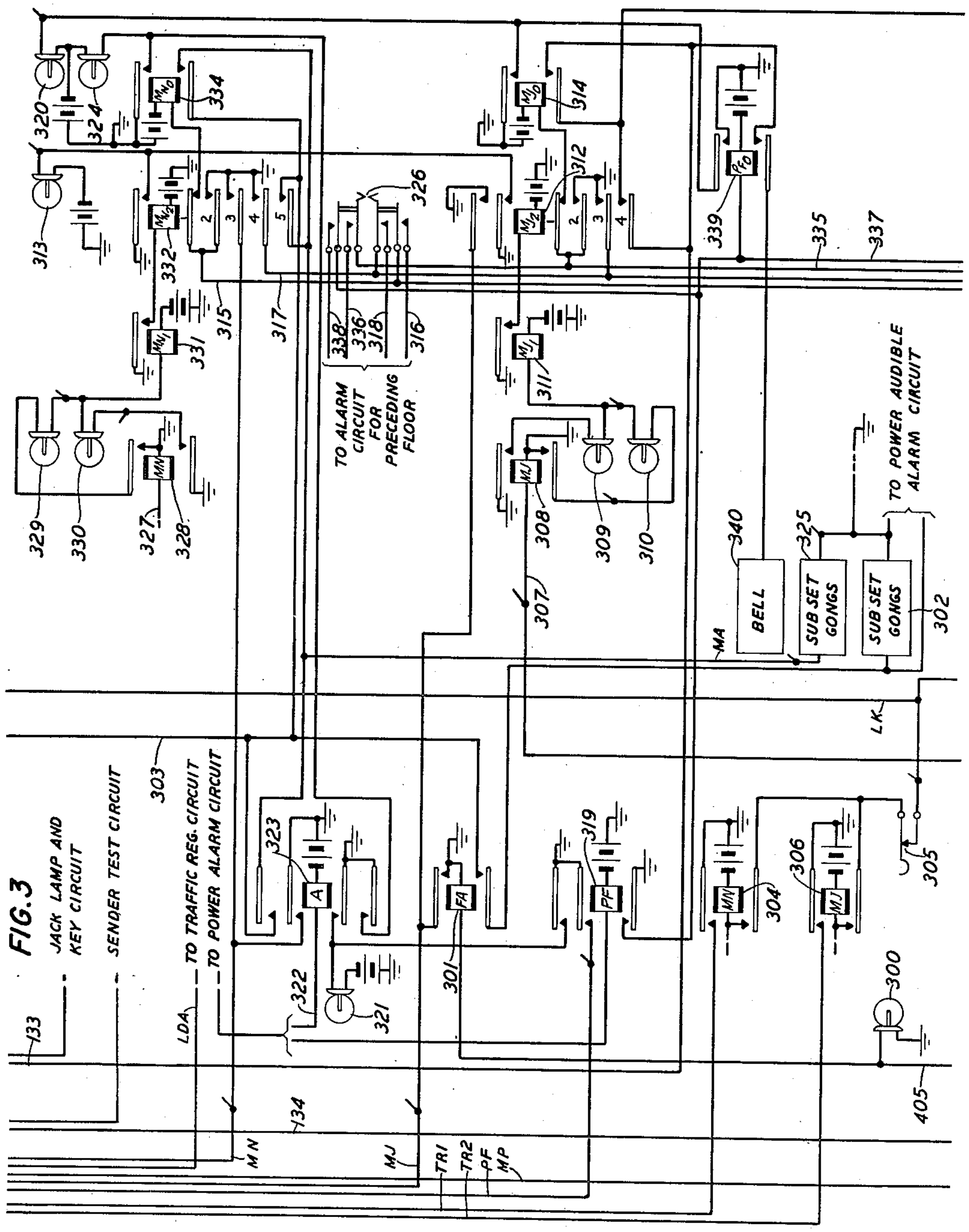
Figure 4:
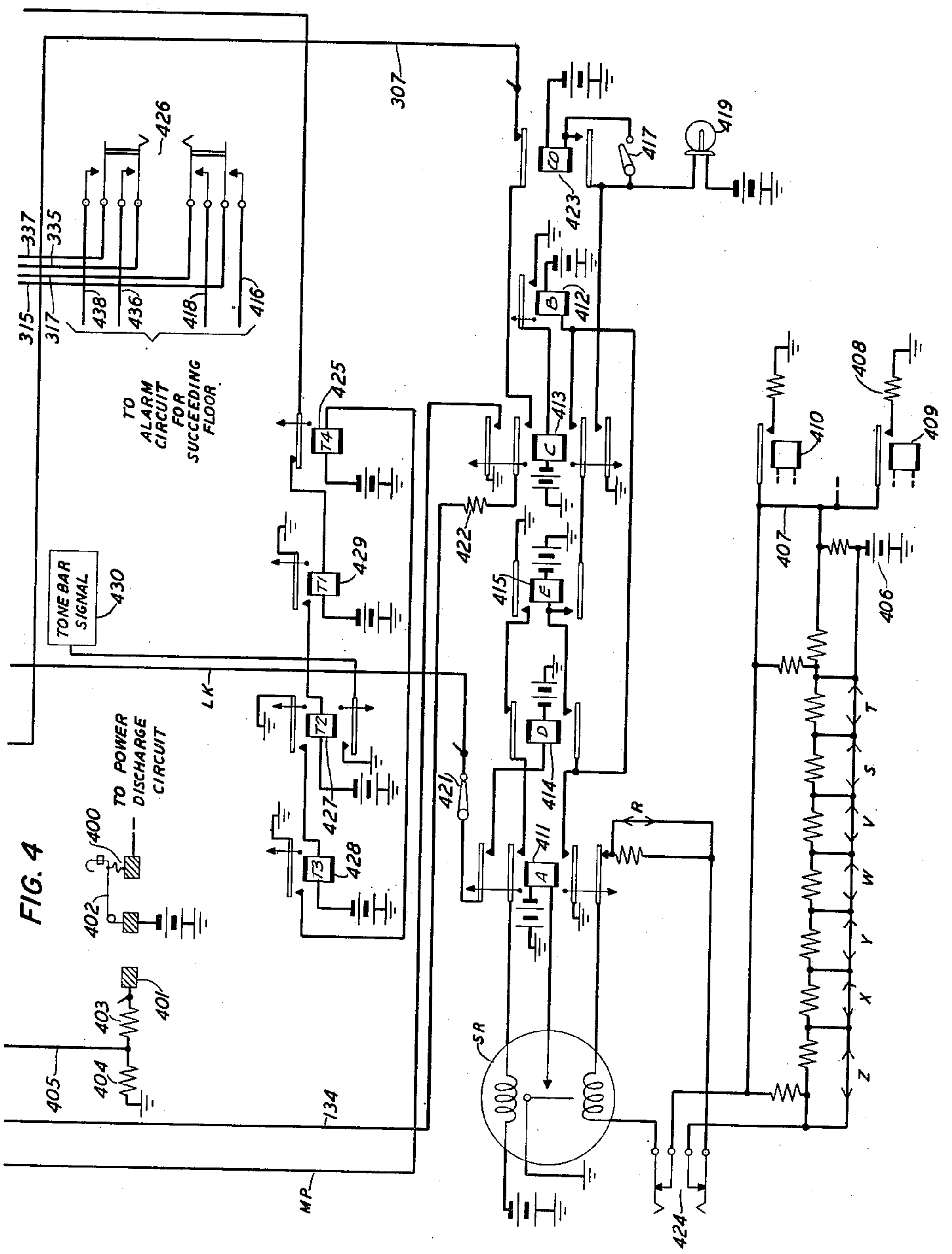
Figure 5:
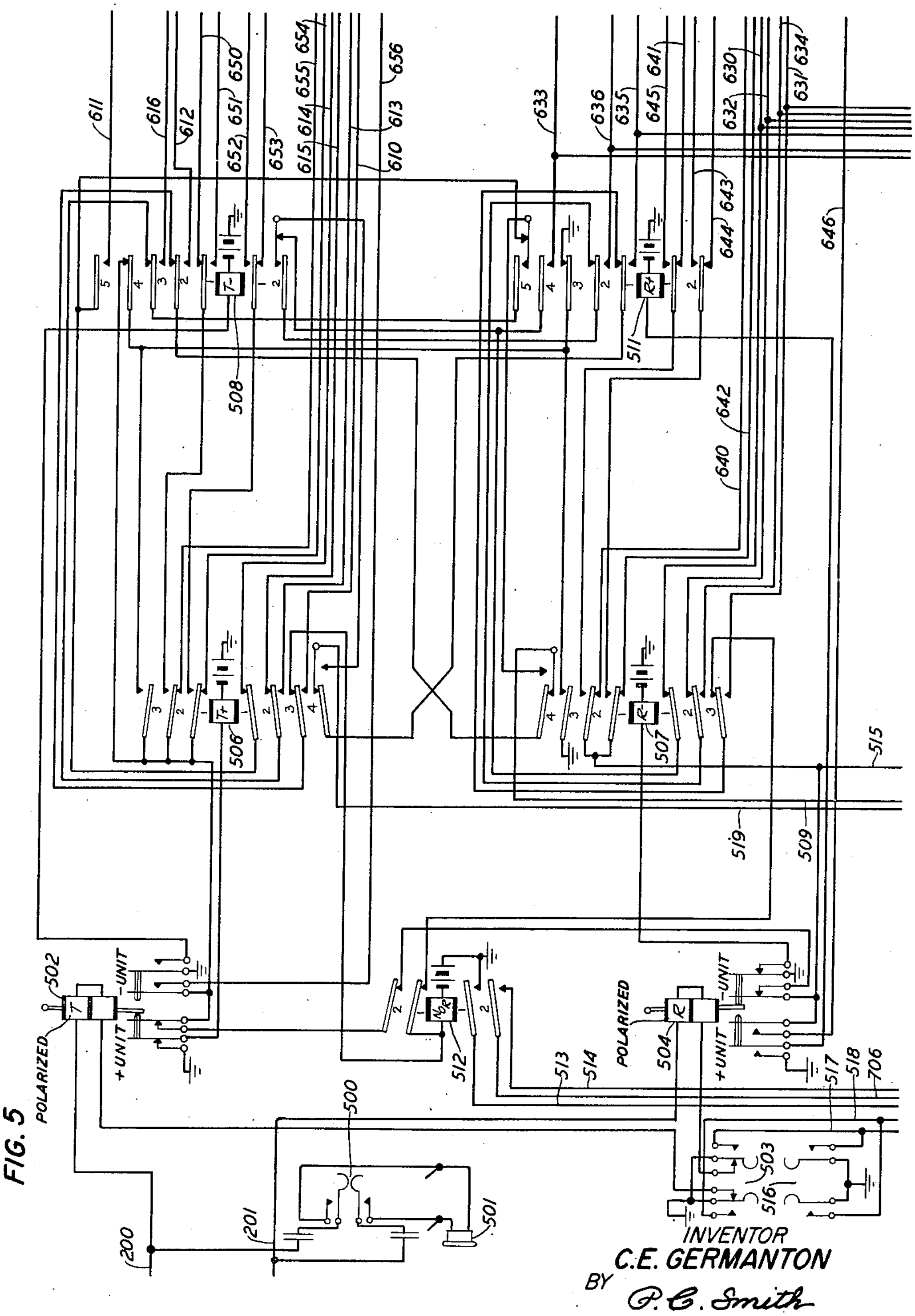
Figure 6:
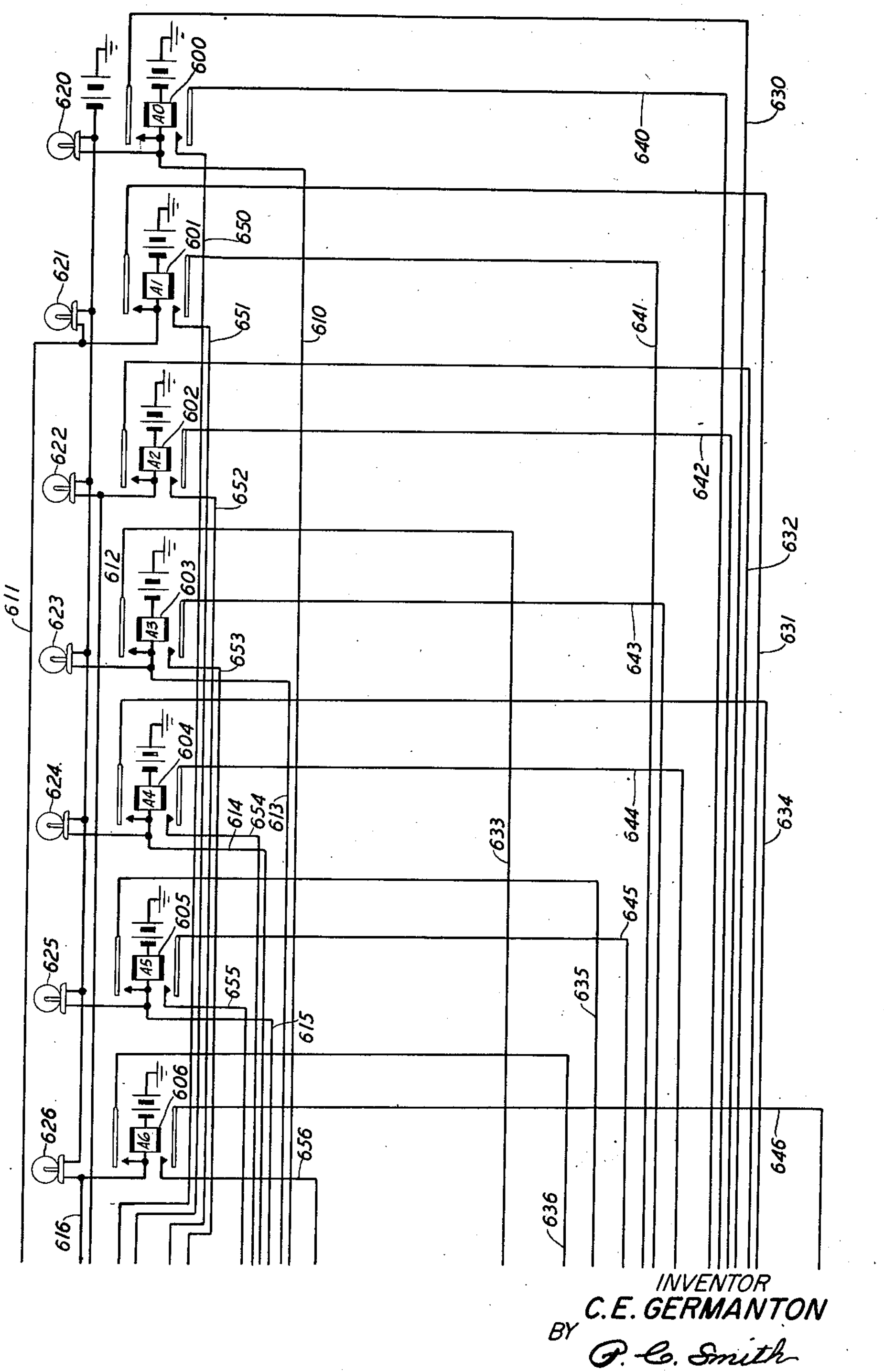
Figure 7:
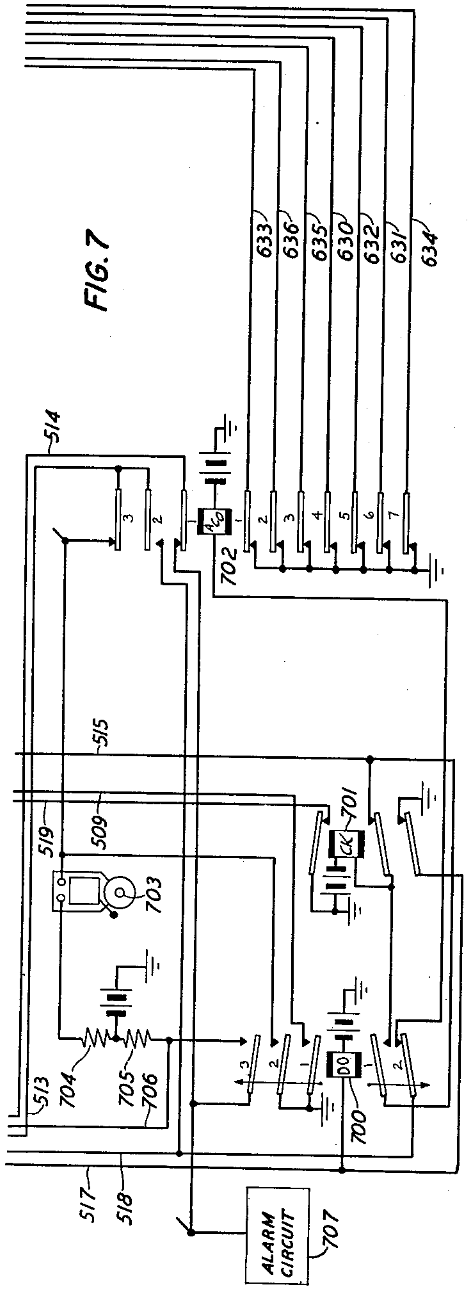
Figure 8:
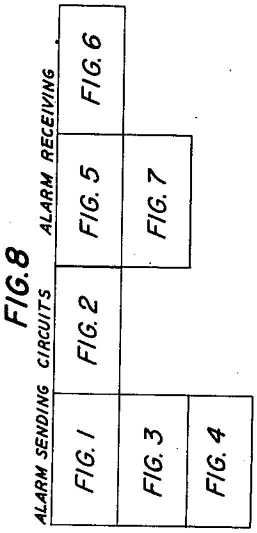

The novel features of the invention are set forth in the appended claims and the invention as to its organization and its mode of operation will be best understood from the following detailed description when read in connection with the drawing in which:

Figs. 1 to 4, inclusive, show alarms, control equipment therefor and alarm sending equipment at an unattended office of a telephone exchange area, Figs. 1 and 2 showing the alarm sending circuits and Figs. 3 and 4 showing the alarms effective at such times as the office is attended and the control circuit for operating such alarms or for controlling the alarm sending circuit when the office is unattended;

Figs. 5, 6 and 7 show the alarm receiving circuits at an attended office which serves the unattended office for maintenance purposes; and Fig. 8 is a diagram showing the manner in which the several figures of the drawing should be assembled to completely disclose the invention.

It will be assumed that the office, the alarm equipment of which is shown in Figs. 1 to 4, inclusive, is unattended and that in its normal condition with all equipment functioning correctly there are no alarm conditions. The relays and switches will therefore be in the condition illustrated and the relays and switches of the alarm receiving station serving the unattended office with maintenance service will be in the condition illustrated in Figs. 5, 6 and 7. With the A relay 100 at the unattended office normal, the audible signal devices in the office are silenced and various circuits in the office are set for unattended operation. A continuous low tone is at this time transmitted from the tone source LTS, over the upper No. 5 back contact of the A relay 100, over the inner left normally closed back contacts of the T— relays 101 to 109, inclusive, conductor 110, over the tip conductor 200 of the signaling trunk extending to the alarm receiving circuits in the attended office, and returning over the ring conductor 201 of the trunk circuit and through condenser 202 to ground. This tone signal may be heard by the maintenance man at the attended office when the listening key 500 is operated to connect the tone receiver 501. This tone indicates that the transfer of alarms is effective.

A circuit is also established from ground through the winding of the FA relay 203 at the unattended office, over conductor 204 and over the upper No. 3 and the No. 7 back contacts of the A relay 100 to battery. Since the battery supplied to operate relay 203 is also supplied over conductor 111 to the windings of the A— relays 210 to 216, inclusive, the operation of relay 203 is a check that battery is present at the windings of the A— relays. With the A— relays normal and relay 203 operated, +130-volt current is applied from the source 205, through resistor 206, over the upper back contacts of the A— relays 216—210, conductor 207, through the winding of the L relay 112, conductor 208, over the inner upper back contacts of the A— relays 213, 212, 211 and 210, the upper contacts of the FA relay 203, trunk conductor 200, through the windings of the tip (T) polarized relay 502 and over the left normal contacts of key 503 to ground. Also —130-volt current is applied from the source 209 through resistor 217, over the inner lower back contacts of the A— relays 216—210, over the lower contacts of the FA relay 203, trunk conductor 201, through the windings of the ring (R) polarized relay 504 and the right normal contacts of key 503 to ground. Relay 112 is held operated if the +130-volt signaling circuit is established and in turn causes the operation of the slow-to-release L1 relay 113 but without effect at this time.

At the alarm receiving circuit, the polarized relay 502 is operated to operate its left spring unit thereby establishing an obvious circuit for the T+ relay 506 and the polarized relay 504 is operated to operate its right spring unit thereby establishing an obvious circuit for the R— relay 507. A circuit is then effective for the NOR relay 512 which may be traced from battery through its winding, over the lower No. 3 front contact of relay 506, the upper No. 2 back contact of the T— relay 508, the upper No. 4 alternate contacts of relay 507, conductor 509 and to ground over the upper No. 1 back contact of the DO relay 700. A circuit is also established for the check (CK) relay 701 which may be traced from battery through its winding, over the lower No. 1 back contact of relay 700, conductor 515, over the inner right contacts of relay 504, the upper No. 2 contacts of relay 512, the inner left contacts of relay 502, the upper No. 4 back contact of the T— relay 508 and to ground over the upper No. 3 back contact of the R+ relay 511. Relay 701 upon operating establishes an obvious operating circuit for the DO relay 700, over its lower contacts and establishes a locking circuit for itself over its inner lower contacts which is effective after relay 700 has operated to open at its lower No. 1 back contact the initial operating circuit for relay 701. Relay 701 also establishes a locking circuit for the NOR relay 512 which extends from battery through the winding and upper No. 1 contacts of relay 512, the lower No. 3 front contact of relay 507, the upper No. 1 back contact of relay 511, the lower No. 4 alternate contacts of relay 506, conductor 519 and to ground over the upper contacts of relay 701. Thus the operated condition of relays 502, 504, 506, 507, 700, 701 and 512 and the released condition of relays 508 and 511 is the normal condition of the receiving circuit and the receiving circuit thereafter continually supervises the trunk against the various trouble conditions which might occur on the trunk such as a break in either the tip conductor 200 or the ring conductor 201; a cross between such conductors; a cross from either conductor to ground or a broken or dirty contact in any of the active paths at the receiving circuit or at the sending circuit.

Any of the above enumerated trouble conditions will cause the release of either or both the left unit contacts of relay 502 and right unit contacts of relay 504 and in turn will cause the successive release of the CK relay 701 and the NOR relay 512. The release of relay 512 will close a circuit over its lower No. 1 back contact, conductor 513, the upper No. 3 back contact of the ACO relay 702, through the alarm bell 703 and resistance 704 to battery causing the bell to ring and will close a circuit from battery through resistor 705, over conductor 706, the lower No. 2 back contact of relay 512, conductor 514 and over the upper No. 1 back contact of relay 702 to the audible and visual alarm circuit 707 of the office. Hereinafter these alarms will be referred to as office alarms. Thus any deviation from the normal supervisory condition results in an alarm.

When an alarm condition appears in the unattended office, one or more of the A— relays 210 to 216, inclusive, will operate causing a signal to be transmitted to the alarm receiving station. These signals are transmitted by the application of positive or negative 130-volt current to either or both of the tip and ring trunk conductors 200 and 201, under the control of the relays 210 to 216, inclusive and will cause the operation of the A— relays 600 to 606 inclusive at the alarm receiving station in accordance with the following table:

*Table I*

| Trunk Conductor | First Relay Operated at Unattended Office Starting with Relay 210 | | | | | | | |
|---|---|---|---|---|---|---|---|---|
| | None | 210 | 211 | 212 | 213 | 214 | 215 | 216 |
| 200 | + | ----- | − | − | ----- | + | + | − |
| 201 | − | − | ----- | − | + | ----- | + | + |
| Alarm Relay at Receiving Office | None | 600 | 601 | 602 | 603 | 604 | 605 | 606 |

It will first be assumed that a fuse blows in the unattended office causing a trouble recorder seizure for a marker first trial failure. Such a fuse is illustrated in Fig. 4 and designated 400. When this fuse blows battery is connected to the fuse alarm bar 401 by the spring 402 of the fuse, establishing a circuit through the resistors 403 and 404 of the potential-divider to ground. With battery applied to the potential-divider, current flows from the junction joint between resistors 403 and 404, over conductor 405 and in parallel through the fuse alarm lamp 300 and the fuse alarm (FA) relay 301 to ground. The lamp 300 lights and relay 301 operates. The operation of relay 301 is not instrumental at this time in operating the subset gong alarm 302 which would be sounded if the office were attended, since with the A relay 100 unoperated, no ringing current from the continuous ringing source 116 is applied over the lower No. 3 contacts of relay 100 to conductor 303 and through the closure of the lower contacts of the FA relay 301 to the gong alarm 302. Relay 301 does, however, connect ground over its upper contacts to the major (MJ) lead and completes the circuit for the A3 relay 213 of the alarm sending circuits of Figs. 1 and 2.

Also with the trouble recorder seized on a first trial marker failure the MN relay 304 is operated, locks over its lower contacts, the contacts of the trouble alarm release key 305, the locking lead LK and to ground over a back contact of the AR1 relay 115 and, over its upper contacts, connects ground to the TR1 lead and thus completes the circuit of the A1 relay 211 of the alarm sending circuits of Figs. 1 and 2.

Relay 211 will be controlling and disconnects the source 205 of +130-volt current from the tip conductor 200 of the trunk circuit and connects the source 218 of −130-volt current, through resistor 219, over the upper No. 3 front contact of relay 211, the upper No. 2 back contact of relay 210, conductor 207, throuh the winding of the L relay 112, conductor 208, the upper No. 1 contacts of relay 211, the upper No. 1 back contact of relay 210, the upper contacts of the FA relay 203 and thence as traced to ground through the windings of polarized relay 502 at the alarm receiving station. Relay 502 thereupon operates to release its left contact unit and to operate its right contact unit. At the same time relay 211 at its lower No. 1 back contact disconnects the −130-volt source 209 from the ring conductor 201 of the trunk circuit thereupon releasing polarized relay 504 at the alarm receiving station to its neutral position in which both of its contact units are released to their open positions.

With the right contact unit of relay 504 now open, the R− relay 507 releases and with the left unit of relay 502 open and the right unit closed the T+ relay 506 releases and the T− relay 508 operates. The locking circuit of the NOR relay 512 is now opened at the lower No. 3 contacts of relay 507 and relay 512 releases to close the circuit of bell 703 and the circuit of the alarm circuit 707, and the locking circuit of the CK relay 701 is opened at the right contacts to relay 504, the upper contact of relay 512 and the left contacts of relay 502 and relay 701 thereupon releases in turn starting the release of relay 700. Relay 700 is slow to release in order that a false registration may be prevented. In this case the T− relay 508 might become operated before the R− relay 507 releases and if no delay were provided the A2 alarm relay 602 would falsely operate over a circuit which might be closed over the upper No. 1 back contact of relay 700 should it release, conductor 509, the upper No. 4 alternate contact of relay 507, the upper No. 2 front contact of relay 508, over conductor 612 and to battery through the winding of the A2 relay 602.

However, by the time the DO relay 700 releases, the R− relay 507 will have released and therefore the closure of the upper No. 1 back contact of relay 700 establishes a circuit from ground over conductor 509, the upper No. 4 normal contacts of relay 507, the upper No. 5 normal contacts of the R+ relay 511, the upper No. 5 contacts of the T− relay 508 and conductor 611 through the winding of the A1 relay 601 and the signal lamp 621 in parallel to battery. Lamp 621 lights and remains lighted over the locking circuit of relay 601 which extends over the upper contacts of relay 601, over conductor 631 and to ground over the lower No. 6 back contact of the ACO relay 702. Relay 700 upon releasing also establishes over its upper Nos. 2 and 3 back contacts additional circuits for the alarms 703 and 707 to maintain such alarms operated following the subsequent operation of the NOR relay 512.

Relay 601 upon operating also establishes a circuit for the CK relay 701 which may be traced from battery through the winding of relay 701, the lower No. 1 back contact of the DO relay 700, conductor 515, the upper No. 2 back contact of the R− relay 507, the lower No. 1 back contact of the R+ relay 511, conductor 641, the lower contacts of the A1 relay 601, conductor 651, the upper No. 1 front contact of the T− relay 508, the upper Nos. 2 and 3 back contacts of the T+ relay 506 and to ground over the upper No. 3 back contact of the R+ relay 511. Relay 701 upon operating causes the reoperation of the DO relay 700 and locks to its operating circuit over the check path independently of relay 700. When relay 700 operates it opens the operating circuit of relay 701 and the initial operating circuit of the A1 relay 611 but relay 611 remains locked up to maintain lamp 621 lighted under the control of the ACO relay 702. The lighting of lamp 621 is indicative of a marker first trial trouble recorder seizure.

As previously stated tone signals of nine different types may be transmitted from the unattended office to the alarm receiving station to more specifically indicate to the maintenance crew at the receiving station the nature of any one of the general categories of trouble that may have arisen at the unattended office. To accomplish this the nine T− relays 101 to 109, inclusive are provided, any one of which may be selectively operated in response to the operation of any one of the A− relays 210 to 216, inclusive. These tone signals are generated by equipment of the unattended office which applies low tone, continuous ringing tone, machine ringing tone and battery click signals used either individually or in combination with one another and are selected by the operation of the T1 to T9 relays 101 to 109 in accordance with the following table:

*Table II*

| Relay Operated | Tones Transmitted from Unattended Office |
|---|---|
| None | Low Tone. |
| T1 | High Speed Battery Clicks. |
| T2 | Interrupted Low Tone. |
| T3 | High Speed Battery Clicks and Low Tone. |
| T4 | Continuous Ringing Tone. |
| T5 | Machine Ringing Tone. |
| T6 | Pulses of Continuous Ringing Tone. |
| T7 | Slow Speed Battery Clicks and Continuous Ringing Tone. |
| T8 | Slow Speed Battery Clicks. |
| T9 | Interrupted Slow Speed Battery Clicks. |

These tone signals are generated from the low tone source LTS, from the continuous ringing current source 116 applied through the condenser 135 to conductor 136 to produce a source of continuous ringing tone, from the continuous ringing current source 116 interrupted by the ringing interrupter 137 and applied through condenser 138 to conductor 139 to produce a source of machine ringing tone and from condensers 140 and 141 which are charged and discharged at a high and a low rate, respectively, to produce battery clicks on conductors 142 and 143 at the rate of four clicks per second and two clicks per second, respectively.

The continuous ringing tone is transmitted from conductor 136 to conductor 110 and thence over the circuit previously traced to the alarm receiving station upon the operation of the T4 relay 104 with the preceding relays 101, 102 and 103 unoperated, and the machine ringing tone is transmitted from conductor 139 to conductor 110 and thus over the circuit previously traced to the alarm receiving station upon the operation of the T5 relay 105 with the preceding relays 101, 102, 103 and 104 unoperated.

The I60 relay 144 is provided to interrupt tone signals when any one of the T relays 102, 103, 106, 107, 108 and 109 is operated and to drive the pulse divider comprising the W relay 145 and the Z relay 146 to operate the I20 relay 147 at half the speed of the relay 144. When any one of relays 102, 103, 106, 107, 108 and 109 operate, ground is connected over right contacts of the operated relay to the start conductor 148 of the GP2 interrupter circuit and ground impulses from the interrupter circuit are delivered over left contacts of such T— relays to relay 144 whereby such relay is operated and released at the rate of sixty times per minute. Thus when the T2 relay 102 operates relay 144 is operated to apply impulses of low tone from the low tone source LTS, over the upper contacts of relay 144, the inner left front contact of relay 102, the left back contact of the T1 relay 101 to conductor 110 and thence over the circuit traced to the alarm receiving station.

Relay 144 is also effective when any one of the T— relays 107, 108 or 109 is operated to enable a charging circuit for condenser 141 each time it is deenergized and to establish a discharge circuit for the condenser each time it is energized. For example, with relay 108 operated and relay 144 deenergized the charging circuit for condenser 141 extends from battery, through resistor 150, through condenser 141, over the inner left front contact of relay 108, the inner left back contacts of relays 107 . . . 101, conductor 110 and thence over the trunk circuit to the alarm receiving station and returning through condenser 202 to ground, and the discharge path extends from ground over the inner upper contacts of relay 144, through resistors 149 and 150 and thence as traced over the trunk circuit and to ground through condenser 202. Thus upon each operation of relay 144 two battery clicks are produced, one when condenser 141 charges and the other when the condenser discharges, and the battery clicks are thus produced at the slow rate of one hundred and twenty per minute. These battery clicks are modified through the operation of the A20 relay 147 as will be presently described and such modified clicks are transmitted to the alarm receiving station when either the T9 or T7 relays 109 or 107 is operated.

Relay 147 is operated to modify these battery clicks through the operation of the pulse divider relays 145 and 146 under the control of relay 144. On a first operation of relay 144 a circuit is established from ground over its lower contacts, the upper back contact of the end of code (EC) relay 151, through the inner upper normal contacts and winding of the W relay 145 to battery and in parallel through the winding of the Z relay 146 to battery. Relay 145 operates but the winding of relay 146 being shunted at its inner upper back contact, relay 146 does not operate. Relay 145 upon operating locks over its inner upper alternate contacts to ground over the lower back contact of relay 151 and the locking ground is extended to the left terminal of the winding of relay 146 but, since the right terminal of such winding is connected over the upper back contact of relay 146, the upper back contact of relay 151 and to ground over the lower contacts of relay 144 so long as relay 144 remains operated, relay 146 does not operate. When, however, relay 144 releases relay 146 operates. Upon the next operation of relay 144 a shunt of the winding of relay 145 is established from ground over the lower contacts of relay 144, the upper back contact of relay 151, the inner upper front contact of relay 146 and to the junction point between the winding of relay 145 and resistor 152 whereupon relay 145 is shunted down and upon releasing opens at its inner upper alternate contacts the operating circuit of relay 146. However, relay 146 remains operated until relay 144 releases over a circuit extending from ground over the lower contacts of relay 144, the upper back contact of relay 151, the upper normal contacts of relay 145 and through the winding of relay 146 and resistor 153 to battery.

With relay 145 released and relay 146 operated a circuit is established from ground over the lower back contact of relay 151, the inner lower contacts of relay 146, the inner lower contacts of relay 145 and through the winding of relay 147 to battery whereupon relay 147 operates and locks over its lower No. 1 contacts to ground at the lower back contact of relay 151.

When relay 144 again releases the holding circuit of relay 146 is opened and relay 146 releases. In the manner previously described, upon the next operation of relay 144, relay 145 again operates and locks and upon the next release of relay 144 relay 146 operates. With relays 145 and 146 now both operated and relay 147 operated, a circuit is established from ground over the upper contacts of relays 146 and 145 and the lower No. 4 contacts of relays 147 and through the winding of relay 151 to battery, whereupon relay 151 operates and locks over its lower contacts and to ground over the lower contacts of either relay 145 or 146 or to ground over the lower No. 3 contacts of relay 147. Thus relay 151 will remain operated until all three of the relays 145, 146 and 147 have released. When relay 151 operates it removes at its lower back contact the locking ground for relay 147 whereupon relay 147 releases and it also removes the holding ground for both relays 145 and 146 and these relays therefore all release and in turn release relay 151. In the meantime, however, relay 144 has again operated but with relay 151 operated as described the connection of ground over its lower contacts has been ineffective. Thus in response to the two operations and releases of relay 144, relay 147 has been operated and released once with the result that whereas relay 144 is operated at the rate of sixty times per minute relay 147 is operated at the rate of thirty times per minute.

It will be recalled that battery clicks were generated by the charging and discharging of condenser 141 under the control of relay 144 upon the operation of any one of the T— relays 107, 108 or 109. When relay 109 is operated these battery clicks are generated and transmitted over a circuit extending over the upper No. 3 back contact of relay 147 and therefore during each three-second interval during which relay 144 will operate and release six times, relay 147 will operate and release three times. Thus during the periods when relay 144 is operated and relay 147 is unoperated a series of battery clicks will be transmitted at the rate of one hundred and twenty per minute and during the periods when relays 144 and 147 are both operated no clicks will be generated and transmitted and thus clicks are transmitted at a low speed intermittently with intervening silent intervals. When relay 107 is operated these battery clicks are generated and transmitted over a circuit extending over the upper No. 2 back contact of relay 147 and therefore battery clicks will be transmitted during the period when relay 144 is operated and relay 147 is unoperated at the rate of one hundred and twenty per minute but continuous ringing tone will be transmitted from conductor 136 over the upper No. 2 front contact of relay 147, over the inner left contacts of relay 107 and as traced to the alarm receiving circuit during periods when relay 147 is operated. Thus series of battery clicks and continuous ringing tone are alternately transmitted.

Relay 147 is also instrumental in transmitting spurts of continuous ringing tone at the rate of thirty per minute, if the T6 relay 106 is operated, over a circuit extending from the continuous ringing tone conductor 136, over the upper No. 1 contacts of relay 147 upon each operation thereof, over the inner left front contact of relay 106 and thence over the circuit previously traced to the alarm receiving station.

If either the T1 or T3 relays 101 or 103 is operated, ground is connected over their right contacts to the start conductor 154 of the GP1 interrupter circuit whereby such interrupter is operated to generate ground impulses on the output conductor 155 at the rate of 120 impulses per minute. With relay 101 operated a charging circuit for condenser 140 is established from battery through resistor 156, over the inner left front contact of relay 101 and thence over conductor 110 and the circuit previously traced over the trunk circuit through condenser 202 to ground and, when ground is supplied at the GP1 interrupter circuit to conductor 155, a discharge circuit for condenser 140 is established from such ground, over conductor 155, the outer left contact of relay 101, resistor 157, through condenser 140 and thence as traced to ground through condenser 202. Condenser 140 is thus charged and discharged at the rate of one hundred and twenty times per minute and thereby produces battery clicks at the rate of two hundred and forty per minute.

If relay T3 is operated the charging and discharging paths for condenser 140 extend over the inner right front contact of relay T3 and the lower No. 2 back contact of relay 147 and when, as previously described, relay 147 is operated at the rate of thirty times per minute, battery clicks are transmitted only when relay 147 is unoperated and when relay 147 is operated low tone is transmitted from the source LTS over the lower No. 2 front contact of relay 147, the inner left front contact of relay 103 and thence to the alarm receiving station. Thus series of high speed battery clicks and low tone are alternately transmitted.

It has been assumed that the A1 relay 211 has operated and has established a circuit from ground over the lower No. 2 normal contacts of relay 210, over the lower No. 2 alternate contacts of relay 211, and through the winding of the C1 relay 221 to battery whereupon relay 221 operated and extended the circuits of the T— relays 101 to 109, inclusive, over conductors 121 to 129, inclusive, to conductors of the group 240. It will also be assumed that to more specifically identify the trouble which caused the marker to make a first trial trouble recorder seizure, ground is connected to conductor 244 of group 240 thereby completing a circuit from such conductor over the inner lower contacts of the C1 relay 221, conductor 124 and to ground through the winding of the T4 relay 104. Relay 104 thereupon operates and connects the source of continuous ringing tone on conductor 136 over the left front contact of the T4 relay 104, over the back contacts of the T3, T2 and T1 relays 103, 102 and 101, thence as traced over conductor 110 to the tip trunk 200 and through the headset receiver 501 at the alarm receiving station. This tone current will meet a high impedance path looking back toward the battery source 218 since it will encounter either the impedance of the winding of the L relay 112 or an open circuit. The maintenance man hearing this particular tone will recognize the specific class of trouble which caused the marker to make a first trial trouble recorder seizure. In this manner any one of nine different kinds of first trial trouble recorder seizure can be signaled to the alarm receiving station.

It is to be noted that the operation of the T4 relay 104 has disconnected the low tone source LTS from the tip of the trunk circuit. If, however, no conductor of the group 240 is grounded and no T— relay is therefore operated, the low tone source LTS will continue to be connected to the tip of the trunk circuit and the maintenance man at the alarm receiving station will continue to hear this tone indicative of an undifferentiated alarm. If more than one of the conductors of group 240 are grounded, resulting in the simultaneous operation of two or more of the T— relays, the lowest numbered T relay will take precedence.

After recording the alarm signals, the maintenance man at the alarm receiving station operates the key 516 thereby closing a circuit from ground over the right contacts of such key and conductor 517 through the winding of the DO relay 700 to battery and, over the left contacts of such key, the lower No. 2 contacts of relay 700 and through the winding of the ACO relay 702 to battery. Relay 702 thereupon operates, locks over a circuit through its winding, the lower No. 2 contacts of relay 700, over its own upper No. 2 contacts, conductor 513 and to ground over the inner lower back contact of the NOR relay 512; releases any of the A— alarm relays which may at the time be operated except the A1 relay 601 which has been operated for the alarm signal being sent out, and at its Nos. 1 and 3 upper back contacts discontinues the office alarms 703 and 707. As long as the same alarm condition persists, the office alarms will be cut off but the alarm lamp 621 will remain lighted.

To enable the remote control of the alarm release, the key 503 is provided. When this key is operated the tip and ring conductors 200 and 201 of the trunk circuit are opened thereby releasing the L relay 112 at the unattended office and releasing the polarized relays 502 and 504 to their neutral positions thereby releasing the operated T— relay 508. At its right contacts key 503 connects ground to conductor 517 to hold the DO relay 700 operated and at its left contacts connects ground to conductor 518 to hold the ACO relay 702 operated. Relay 508 upon releasing, opens the locking circuit for the operated A1 relay 601 and such relay then releases, opening the circuit of alarm lamp 621 which becomes extinguished and opening the locking circuit of the CK relay 701 which then releases.

At the unattended office the release of the L relay 112 opens the circuit for the L1 relay 113 and with the key 503 held operated, as it should be for at least one second, relay 113, which is slow to release, then releases. Relay 113 is made slow-to-release to guard against the unintentional opening of the trunk circuit for short durations as when the alarm signals are changed. When relay 113 releases, it opens the circuit of the AR relay 117 and establishes a circuit from ground over its lower contacts, the contacts of relay 117 and through the winding of the AR1 relay 115 to battery. Relay 117 is made slow-to-release so that it maintains the circuit of relay 115 closed for a sufficient interval to release the alarms in the connecting circuits. It will be recalled that it was assumed that a trouble recorder seizure had taken place and the MN relay 304 was operated upon such recorder seizure and was locked over the lead LK to a back contact of relay 115. The operation of relay 115 now removes ground from lead LK thereby releasing the MN relay 304 in turn releasing the A1 relay 211 and the C1 relay 221.

With the A1 relay 211 released, the A3 relay 213 will now take control and establish the circuit for the C3 relay 223, which circuit may be traced from battery through the winding of such relay, over the lower No. 2 alternate contacts of relay 213 and in series over the lower No. 2 normal contacts of relays 212, 211 and 210 to ground. Relay 213 also applies +130-volt current from the source 205, through resistor 206, over the upper No. 2 front contact of relay 213, the upper back contacts of relays 212, 211 and 210, conductor 207, through the winding of the L relay 112, conductor 208, over the lower No. 1 front contact of relay 213, the lower No. 1 back contacts of relays 212, 211 and 210, the lower contacts of relay 203, ring conductor 201 of the trunk circuit, through the winding of polarized relay 504 and to ground over the right normal contacts of key 503, which key has now been restored. Relay 112 at the unattended office now operates, in turn causing the reoperation of the L1 relay 113. Relay 213 is not effective to establish a circuit over the tip conductor 200 of the trunk circuit.

At the alarm receiving station, the operation of polarized relay 504 in response to current of positive polarity closes its left contact unit thereby causing the operation of the R+ relay 511. Since no potential was connected to the tip conductor 200 of the trunk circuit, polarized relay 502 remains in its neutral position in which both of its contact units are open and consequently the T+ and T— relays 506 and 508 are both unoperated. With both keys 503 and 516 restored, the DO relay 700 and the ACO relay 702 are now released.

Relay 700 upon releasing establishes a circuit for the operation of another A— relay in accordance with the incoming alarm signal which has caused the operation of the R+ relay 511. This circuit may be traced from ground over the upper No. 1 back contact of relay 700, conductor 509, the upper No. 4 normal contacts of relay 507, the upper No. 5 alternate contacts of relay 511, the upper No. 3 back contact of relay 508, the lower No. 2 back contact of relay 506, conductor 613 and to battery through the winding of the A3 relay 603. Relay 603 thereupon operates, locks over its upper contacts and conductor 633 to ground over the lower No. 1 back contact of the ACO relay 702, and establishes the circuit of alarm lamp 623 over its locking circuit. The lamp 623 lights as a visual signal and the circuits of the audible alarms 703 and 707 are again made effective through the release of the ACO relay 702. Relay 623 upon operating also establishes a check circuit for the CK relay 701 extending from battery through its winding, over the lower No. 1 back contact of relay 700, conductor 515, the upper No. 1 back contact of relay 507, the lower No. 2 front contact of relay 511, conductor 643, the lower contacts of relay 623, conductor 653, the lower No. 1 back contact of relay 508, the upper No. 1 back contact of relay 506, the upper No. 3 back contact of relay 506 and to ground over the upper No. 3 back contact of relay 507. Relay 701 will thus operate if the T+, T—, R— and R+ relays 506, 508, 507 and 511 are in the proper condition to operate the alarm relay 623 and that alarm relay operates as it should in response to the alarm signal. Relay 701 upon operating locks to the check circuit and causes the reoperation of the DO relay 700 which opens the operating circuit of the alarm relay 603.

If the fuse alarm relay is arranged to apply ground to one of the group of conductors 250, one of the T— relays 201 to 209, inclusive, will be operated and apply a corresponding tone signal over the trunk circuit. It will be assumed that ground is applied to conductor 258 whereby a circuit is completed over the upper No. 4 contacts of the C3 relay 233, conductor 128 and through the winding of the T8 relay 108 to battery. Relay 108 will thereupon operate to remove the tone signal previously applied from the tone lead 136 and will establish a start circuit over its right contacts to start conductor 148 of the GP2 interrupter circuit whereby relay 144 is intermittently operated to transmit battery clicks over a circuit extending over the inner left front contact of relay 108 and thence as traced over the tip conductor 200 of the trunk circuit, through the headset receiver 501 at the alarm receiving station, and returning over the ring conductor 201 of the trunk circuit and through condenser 202 to ground. The maintenance man will therefore hear a distinctive tone which, with lamp 623 lighted, will be indicative of a specific fuse trouble at the unattended office.

Since the trouble under consideration is an alarm due to a blown fuse the previous temporary operation of the AR1 relay 115 in response to the operation of the remote alarm release key 503 has no effect with respect to the fuse alarm condition.

After recording the alarm signal the maintenance man at the alarm receiving station operates the key 503, thereby causing the operation of the ACO relay 702 to still the audible alarms 703 and 707 and to extinguish lamp 623. Key 503 also opens the tip and ring conductors 200 and 201 of the trunk circuit thereby releasing the operated polarized relay 504 to its neutral position in turn releasing operated relay 511 which in turn causes the release of the alarm relay 603 and the extinguishment of lamp 623. The release of relay 511 also releases the CK relay 701. The DO relay 700 and the ACO relay 702 are held operated until the key 503 is released.

At the unattended office the L relay 112 releases followed by the operation of slow-to-release relay 117, the release of slow-to-release relay 113, the operation of relay 115, the release of relay 117, and the release of relay 115 in the cycle outlined. When a maintenance man, dispatched from the alarm receiving station to the unattended office, has remedied the indicated trouble as, for example, by replacing the blown fuse 400 and relay 301 is released, ground is removed from the MJ lead thereby releasing relay 213 and in turn releasing relay 223. The release of relay 223 in turn releases relay 100 to discontinue the transmission of the battery clicks and to cause the retransmission of the low tone.

With relay 223 released, the normal alarm signal is transmitted over the tip and ring conductors of the trunk circuit, as soon as the remote alarm release key 503 has been restored, again causing the operation of polarized relay 502 to operate its left contact unit and to thereby cause the reoperation of the T+ relay 506 and causing the operation of polarized relay 504 to operate its right contact unit to cause the reoperation of the R— relay 507. Relays 506 and 507 now operated with relays 508 and 511 not operated cause the operation of the NOR relay 512 and the operation of the CK relay 701 as previously described. When relay 701 operates it causes the reoperation of the DO relay 700 which opens the operating path over conductor 509 for the A— alarm relay. Relay 700 also releases the ACO relay 702 but with the NOR relay 512 now operated, the circuits of the audible alarms 703 and 707 are not completed.

It will now be assumed that while the remote office is unattended a trouble condition has caused the trouble recorder to be seized for a marker second trial failure. This will result in the operation of the MJ relay 306. A typical circuit arrangement for operating relay 306 is shown in Patent No. 2,508,052 to O. H. Williford, granted May 16, 1950, where conductor 207 is grounded to cause a major alarm. Relay 306, when operated, will lock over its lower contacts, the contacts of key 305, lead LK and to ground over a back contact of the AR1 relay 115, and the establishment of a connection from ground over its upper contacts, lead TR2 and through the winding of the A0 alarm sending relay 210 to battery. Relay 210 will thereupon operate in turn causing the operation of the C0 relay 220 over its lower No. 2 contacts and the connection of —130-volt current from the source 218 through resistor 219 over the upper No. 2 contacts of relay 210, conductor 207, through the winding of the L relay 112, conductor 200, the lower No. 1 front contact of relay 210, the lower contacts of the FA relay 203, the ring conductor 201 of the trunk circuit, through the winding of polarized relay 504 and the right contacts of key 503 to ground. Relays 112 and 504 will thereupon operate, relay 504 operating its right contact unit to cause the operation of the R— relay 507. The tip conductor 200 of the trunk circuit will in this case be open and polarized relay 502 will be in its neutral position in which both of its contact units are open and the T+ and T— relays 506 and 508 are both released. Under these conditions a circuit is established for the A0 relay 600 to light the alarm lamp 620. Since the circuits at the alarm receiving station function in the manner previously described, it is deemed to be unnecessary to trace in detail the circuits for relay 600 and lamp 620.

It will further be assumed that to more specifically identify the trouble at the unattended office, ground is connected to conductor 261 of the group 260 whereby a circuit is established over the lower No. 4 contacts of operated C0 relay 220, conductor 121 and through the winding of the T1 relay 101 to battery. Relay 101 upon operating disconnects the tone source then connected to the trunk circuit and establishes a circuit from ground over its right contacts to start conductor 154 of the GP1 interrupter circuit whereupon high speed battery clicks are generated as previously described, and transmitted over the inner left front contact of relay 101 and thence as traced over the trunk circuit and through the headset receiver 501 at the alarm receiving station. The maintenance man thereat upon seeing the lighted alarm lamp 620 and hearing the high speed battery click signal, will be apprised of the fact that a particular type of trouble has caused the seizure of the trouble indicator at the unattendted office upon a second trial failure of a marker.

In the event a heavy traffic condition at the unattended office has been registered by the traffic register circuit, ground is connected to the LDA lead thereby causing the operation of the A5 alarm sending relay 215 and the operation of the C5 relay 225. In this case, as will be noted by reference to Table I, current from the +130-volt sources 205 and 227 will be connected by relay 215 to the tip and ring conductors 200 and 201 of the trunk circuit resulting in the operation of polarized relays 502 and 504 at the alarm receiving station to operate their left contact units thereby causing the operation of the T+ relay 506 and the R+ relay 511 and the consequent operation of the A5 alarm relay 605 and the lighting of alarm lamp 625. If one of the conductors of the group 270 is grounded, resulting in the operation of one of the T— relays, a distinctive tone signal will be transmitted to the alarm receiving station and the maintenance man seeing the lighted alarm lamp 625 and hearing the tone signal will be apprised of the type of traffic congestion that has arisen at the unattended office.

Should a major alarm condition arise at the unattended office, battery will be connected to lead 307 resulting in the operation of relay 308 which lights both the aisle pilot lamp 309 and the main aisle pilot lamp 310 in circuits extending through the winding of the MJ1 relay 311. Relay 311 also operates in turn causing the operation of the MJ2 relay 312. Relay 312 upon operating causes an exit pilot lamp 313 on each floor of the office building, except the floor where the trouble has arisen, to be lighted and connects ground over its upper contacts to the MJ lead thereby causing the operation of the A3 alarm sending relay 213. Relay 213 upon operating functions as previously described to cause the lighting of the alarm lamp 623 at the alarm receiving station. If required, through the operation of the C3 relay 223, a distinctive tone signal may also be transmitted to the alarm receiving station.

Should a minor alarm condition arise at the unattended office, battery will be connected to the lead 327 resulting in the operation of the MN relay 328 which lights both the aisle pilot lamp 329 and the main aisle pilot lamp 330 in circuits extending through the winding of the MN1 relay 331. Relay 331 also operates in turn causing the operation of the MN2 relay 332. Relay 332 upon operating lights the exit pilot lamp 313 of each floor of the office building, except the floor where the trouble has arisen, and connects ground over its lower No. 3 contacts to the MN lead thereby causing the operation of the A6 alarm sending relay 216. Relay 216 upon operating causes the operation of the C6 relay 226 and the transmission of a signal to the alarm receiving station by the connection of the −130-volt source 218 to the tip conductor 200 of the trunk circuit and the connection of the +130-volt source 227 to the ring conductor 201 of the trunk circuit. In response to this signal the polarized relay 502 is operated to close its right contact unit to cause the operation of the T− relay 508 and the polarized relay 504 is operated to close its left contact unit to cause the operation of the R+ relay 511. With relays 508 and 511 operated and relays 506 and 507 unoperated, the A6 alarm relay 606 is operated in turn causing the lighting of alarm lamp 626. If required, through the operation of the C6 relay 226, a distinctive tone signal may also be transmitted to the alarm receiving station. The maintenance man thereat seeing the lighted lamp 626 and hearing the distinctive tone is apprised of the fact that a minor alarm condition has arisen at the unattended office.

A typical circuit for operating major alarm relay 307 is shown in Fig. 122 of the above-identified Busch application, while a typical circuit for operating minor alarm relay 328 is shown in Fig. 119 of the same application.

Should there be a power failure at the unattended office ground is applied to the winding of the PF relay 319 which operates, in turn causing the operation of the PF0 relays 339 on all switching floors, which relays in turn cause the lighting of the yellow floor pilot lamps 320. Relay 319 also causes the lighting of the exit pilot lamps 320. Relay 319 also causes the lighting of the exit pilot lamp 321 for the power room and connects ground to the OF lead extending to the alarm sending circuits thereby causing the operation of the A2 alarm sending relay 212. Relay 212 upon operating causes the operation of the C2 relay 222 and the transmission of a signal to the alarm receiving station by the connection of the −130-volt sources 218 and 209 to the tip and ring conductors 200 and 201 of the trunk circuit thereby causing the polarized relays 502 and 504 to operate their right contact units to cause the operation of the T− and R− relays 508 and 507 and the consequent operation of the A2 alarm relay 602. With alarm relay 602 operated, the alarm lamp 622 is lighted. If required, through the operation of the C2 relay 222, a distinctive tone signal may also be transmitted to the alarm receiving station. The maintenance man thereat seeing the lighted signal lamp 622 and hearing the distinctive tone is apprised of the nature of the power failure at the unattended office.

There may be a minor power failure at the unattended office in which case ground is applied to conductor 322 thereby causing the operation of relay 323. In such case relay 323 upon operating causes the lighting of the exit pilot lamp 321 for the power room and the lighting of the green pilot lamp 324 on the floor from which power alarms are supervised and connects ground to the MN lead whereby the A6 alarm sending relay of the sending circuits is operated to transmit a minor alarm signal to the alarm receiving station to thereby cause the lighting of signal lamp 626 thereat in the manner previously described. If required, through the operation of the C6 relay 226 a distinctive tone signal may also be transmitted to the alarm receiving station.

A permanent signal condition may also arise at the unattended office in which case a signal is transmitted to the alarm receiving station indicative thereof. The permanent signal alarm circuit of the unattended office is shown in the lower portion of Fig. 4. A typical permanent signal trunk is shown in the application of J. Michal, Serial No. 57,381, filed October 29, 1948, in which relay S2(5) corresponds to relays 409 and 410 of the present disclosure. The "sensitrol" relay SR and resistance network are connected from battery 406 to all permanent signal trunks or common overflow trunks or combinations of both over the lead 407. When a trunk becomes busy as the result of a permanent signal condition, ground through a 1000-ohm resistance 408 is connected by the operation of a relay, such as 409, to lead 407 and as the number of trunks in a permanent signal condition increases, the current drain is increased and proportionally more current will flow through the lower operating winding of the relay SR until it operates and gives an alarm.

The wiring of the resistance network controls the current flow through the lower winding of relay SR and by the removal of the straps R, S, T, V, W, X, Y and Z may be adjusted so that the relay SR will operate when a desired number of trunk circuits have a permanent signal condition. Thus by removing the straps in different combinations the relay may be caused to operate when permanent signals occur on two trunks and up to forty-one trunks.

It will be assumed that with the strapping as shown the relay SR will operate when permanent signals appear on two trunks as would be the case if both relays 409 and 410 were operated. The current through the lower winding of relay SR flows over a circuit which extends over the lowermost contacts of relay 411 and over the normal contacts of the disabling key 424. When relay SR operates to close its contacts it causes the operation of relay 411. Relay 411 is made slow-to-release so that once operated it will hold over any chatter of the contacts of relay SR. Relay 411 upon operating opens the circuit through the lower operating winding of relay SR to protect the winding against excessive current and establishes the circuit of relay 412 which operates in turn causing the operation of the slow-to-release relay 413. Relay 411 also connects the LK lead over its upper contacts to the winding of relay 414 and, since ground is connected to the LK lead at a back contact of the AR1 relay 115 of the alarm sending circuits, relay 414 operates. When relay 413 operates, with switch 417 operated, the circuit of the C0 relay 423 is closed and lamp 419 is lighted, relay 423 opening the circuit to the alarm lead 307 to cut off the audible alarm. Relay 423 locks over its lower contacts after the non-locking key 417 is released.

When relay 414 operates, with relay 411 operated, the circuit of relay 415 is established and it operates and locks over its lower contacts, the inner lower contacts of relay 413 and the inner lower contacts of relay 411 to ground, and connects ground over its upper contacts to the back contact of relay 414 preparatory to restoring the sensitrol relay SR when relay 414 later releases. Relay 413 at its upper contacts connects ground to lead MP for causing the operation of the A4 alarm sending relay 214 of the alarm sending circuits. Relay 214 upon operating causes the operation of the C4 relay 224 and the transmission of a signal to the alarm receiving station by the connection of the +130-volt source 205 to the tip conductor 200 of the trunk circuit and no potential to the ring conductor 201 thereby causing the polarized relay 502 to operate its left contact unit to cause the operation of the T+ relay 506. Polarized relay 504 is at this time in its neutral position in which both the R− and R+ relays 507 and 511 are unoperated. With relay 506 operated the A4 alarm relay 604 is operated to cause the lighting of alarm lamp 624. If required, through the operation of the C4 relay 224, a distinctive tone signal may also be transmitted to the alarm receiving station. The maintenance man seeing the lighted lamp 624 and hearing the distinctive tone is apprised of the fact that a permanent signal condition exists at the unattended office.

When thereafter ground is removed from the LK lead through the operation of an AR1 relay 115 in the manner previously described or the switch 421 is opened, relay 414 releases and closes the circuit from ground over the upper contacts of relay 415, the upper back contact of relay 417, the next-to-upper contacts of relay 411 and through the upper restoring winding of the relay SR to battery. The contacts of relay SR are through the energization of the restoring winding forced apart thereby opening the circuit of relay 411. Relay 411 thereupon releases in turn releasing relays 412 and 415 and reclosing the circuit through the lower operating winding of relay SR. Relay 412 then releases in turn releasing relay 423 to extinguish lamp 419 and removes ground from the MP lead.

If when relay 411 releases after the relay SR is restored to normal, sufficient permanent signals are still present to operate the relay SR, it again causes the reoperation of relays 411, 412 and 413. Relays 412 and 413 are slow-to-release so that when this condition arises relay 413 will not be released before the circuit through its lower winding is reestablished and ground will be maintained on the MP lead and the circuit through the upper restoring winding of the sensitrol relay will remain open since both relays 414 and 415 are released. When ground is reconnected to lead LK or the key 421 is reclosed, relay 414 operates to keep the restoring circuit open and relay 415 operates under the control of relay 411 as previously described.

If it should be found desirable to prevent the operation of the permanent signal alarm circuit, key 424 is operated thereby opening the circuit through the lower operating winding of the sensitrol relay SR.

If there is a power service failure, ground becomes connected to conductor 230 thereby causing the operation of the PSF relay 231 in the alarm sending circuit and relay 231 locks through its upper winding and over its upper contacts and conductor 232 to ground at the lower contacts of the L relay 112; connects ground over its lower contacts to the MN lead, thereby causing the operation of the A6 relay 216 and the C6 relay 226; and with relay 226 operated extends its locking ground over conductor 291 of the tone group 290 and through the winding of the T1 relay 101 to battery. In the manner previously described relay 216 causes the lighting of alarm lamp 626 at the alarm receiving station and relay 101 causes the transmission of a tone signal comprising high speed battery clicks to the alarm receiving station. When the attendant at the alarm receiving station operates the alarm release key 503, the L relay 112 relases in turn releasing relay 231 if the trouble has been cleared.

If there is a failure of the battery supply, ground becomes connected to conductor 233 thereby causing the operation of the ABA relay 234 in the alarm sending circuit and relay 234 locks through its upper winding and upper contacts and conductor 232 to ground at the lower contacts of the L relay 112; connects ground over its lower contacts to the MJ lead thereby causing the operation of the A3 relay 213 and the C3 relay 223; and with relay 223 operated extends its locking ground over conductor 251 of the tone group 250 and through the winding of the T1 relay 101 to battery. In the manner previously described, relay 213 causes the lighting of alarm lamp 623 at the alarm receiving station and relay 101 causes the transmission of a tone signal comprising high speed battery clicks to the alarm receiving station. When the attendant at the alarm receiving station operates the alarm release key 503, the L relay 112 releases in turn releasing relay 234 if the trouble has been cleared.

In the previous discussion, it has been assumed that the office, the alarm circuits of which are disclosed in Figs. 3 and 4, has been unattended. It will now be assumed that, temporarily at least, maintenance men are in attendance at such office. At the outset of such attendance the key 130 is operated thereby causing the lighting of lamp 131 from battery supplied over the upper No. 7 back contcat of the A relay 100. The non-locking key 132 is then temporarily operated to cause the operation of the A relay 100 which locks over its upper No. 6 contacts and the lower front contact of the L1 relay 113 to ground over the contacts of key 130; extinguishes the guard lamp 131; removes battery at its upper No. 7 back contact from the windings of the A− relays 210 to 216, inclusive; holds the FA relay 203 operated over its upper No. 4 contacts; at its upper No. 5 back contact removes the low tone current from the trunk circuit as an indication that the alarms have been withdrawn; reconnects the ringing source 116 to conductor 303 and ground to conductor 133 to enable the operation of the audible alarms of the office, and signals various alarm circuits of the office to prepare for attended operation.

Should a minor alarm condition now arise in which case relays 328, 331 and 332 are operated and pilot lamps 329, 330 and 313 are lighted as previously described, the connection of ground to lead MN is now without effect but ringing current applied to conductor 303 from the source 116 is now applied over the lower No. 5 contacts of relay 332 and through the subset gongs 325 which ring to give a minor alarm signal. Relay 332 over its lower No. 2 contacts also connects ground to conductor 315 which is extended over the contacts of the alarm grouping key 326 and conductor 316, over the No. 1 back contact of the relay of the alarm circuits on the preceding floor, if any, corresponding to relay 332 and to battery through the winding of a relay corresponding to the MNO relay 334, if such floor has cross bar equipment of the same general type, and over contacts of the alarm grouping key 426 and conductor 416, over the No. 1 back contact of the relay of the alarm circuits on the succeeding floor, if any, corresponding to relay 332 and to battery through the winding of a relay corresponding to the MNO relay 334 if such floor has cross bar equipment of the same general type. The MNO relays in the alarm circuits of the preceding and succeeding floors thus operate to close the circuits for lighting the green pilot lamps corresponding to lamp 324 on those floors and to establish circuits for the subset gongs, corresponding to gongs 325, on those floors. The circuit for the subset gongs on each of these floors would extend through the gongs corresponding to gongs 325, over the lower contacts of the MNO relay corrsponding to relay 334, conductor 303 and over the lower No. 3 contacts of relay 100 to the ringing current supply 116. It is to be noted that the operation of relay 332 opens at its No. 1 back contact the operating circuit of the MNO relay 334 so that the green pilot lamp 324 on the floor where the trouble originated does not light. If the preceding or succeeding floors have equipment other than cross bar equipment the connection of ground over the No. 2 contacts of relay 332 to conductor 315 will result only in sounding an audible alarm on that floor of the proper type and the connection of ground over the lower No. 4 contacts of relay 332 to conductor 317 and thence over contacts of the grouping key 326 or 426 to conductor 318 or 418 will cause the lighting of the single floor pilot lamps on those floors.

Should a major alarm condition arise in which relays 308, 311 and 312 are operated and pilot lamps 309, 310 and 313 are lighted as previously described, the connection of ground to lead MJ is now without effect but an audible tone bar signal device on the floor where the trouble condition has arisen is operated under the control of relay 312. Relay 312 upon operating establishes a circuit from ground applied over conductor 133, thence over the lower No. 4 contacts of relay 312, over the back contact of slow-to-release relay 425 and through the winding of slow-to-release relay 429 to battery. Relay 429 thereupon operates and causes the operation of slow-to-release relays 427, 428 and 425 in succession. When relay 427 operates its establishes the circuit for tone bar signal 430 which then sounds. When relay 425 operates it opens the circuit of relay 429 which releases after an interval and in turn opens the circuit of relay 427 which releases after a further interval and opens the circuit of the tone bar signal 430. Relays 428 and 425 then release in turn whereupon relays 425, 429, 427 and 428 repeat their operating and releasing cycles. The tone bar signal is thereby intermittently operated so long as relay 312 remains operated.

Relay 312 over its lower No. 2 contacts also connects ground to conductor 335 which extends over the contacts of the alarm grouping key 326 and conductor 336, over the No. 1 back contact of the relay of the alarm circuit on the preceding floor, if any, corresponding to relay 312 and to battery through the winding of a relay corresponding to the MJO relay 314 if such floor has cross bar equipment of the same general type, and over contacts of the alarm grouping key 426 and conductor 436, over the No. 1 back contact of the relay of the alarm circuit on the succeeding floor, if any, corresponding to relay 312, and to battery through the winding of a relay corresponding to the MJO relay 314 if such floor has cross bar equipment of the same general type. The MJO relays in the alarm circuits of the preceding and succeeding floors thus operate to close the circuits for lighting the yellow pilot lamps 320 on those floors and to establish circuits for the tone bar signals on those floors. Such latter circuits correspond to the circuit disclosed as extending over the lower contacts of relay 314. It is to be noted that the operation of relay 312 opens at its No. 1 back contact the operating circuit of the MJO relay 314 so that the yellow pilot lamp 320 on the floor on which the trouble originates is not lighted. Relay 312 also connects ground to conductor 317 to operate a single pilot lamp on the succeeding or preceding floors if such floors have equipment other than cross bar equipment and in such case the connection of ground to conductor 335 will result in the sounding of suitable audible alarms on the succeeding and preceding floors.

If a power failure occurs and the PF relay 319 is operated and causes the lighting of lamp 321 and the operation of the PFO relay 339, then with the office assumed to be attended, the connection of ground to the PF lead is not instrumental in operating the A2 alarm sending relay 212. Relay 339 upon operating establishes the circuit of the yellow pilot lamp 320 and with ground now applied to conductor 133 through the operation of relay 100, establishes a circuit over its lower contacts to the subset bell 340 which sounds as a major audible alarm for power failure.

If a minor power failure occurs and relay 323 is operated, lamps 321 and 324 are lighted as before described but the connection of ground to lead MN is ineffective at this time to operate the A6 alarm sending relay 216. However, with the generator 116 connected to conductor 303 through the operation of relay 100, the operation of relay 323 completes the circuit of subset gongs 325 over its upper contacts which gongs then sound as an audible signal of a minor power failure trouble.

If the fuse alarm relay 301 is operated, the connection of ground over its upper contacts to the MJ lead is ineffective to operate the A3 alarm sending relay 213 but with ringing current applied to conductor 303, relay 301 connects ringing current over its lower contacts to the subset gongs 302 which gongs sound as a major trouble signal. In the case a distributing fuse blows on a floor other than the floor on which the cross bar equipment is located and such floor has been grouped to the cross bar equipment floor then the connection of ground to conductor 337 over contacts of a grouping key causes the operation of relay 339 to operate the bell 340 indicative of a fuse failure.

If a permanent signal condition arises on several trunks and relay 413 of the permanent signal alarm circuit is operated, a circuit is established from battery over the upper No. 2 contacts of relay 100, conductor 134, through resistor 422, over the inner upper contacts of relay 413, the back contact of relay 423 and conductor 307 to cause the operation of the MJ relay 308 and the functioning of the major alarm of the alarm circuit.

When the office is to be returned to its unattended status the transfer key 130 is released thereby permitting the release of the A relay 100. Should the maintenance man neglect to transfer the alarms when unattending the office, the alarms may be transferred by remote control from the alarm receiving station. The maintenance man at the alarm receiving station may check to ascertain if the alarm circuits have been transferred by listening for the normal low tone signal. If he does not hear this signal, indicating that transfer has not taken place, he will then operate key 503 for a short time thereby opening the tip and ring conductors 200 and 201 of the trunk circuit and releasing the L relay 112 at the unattended office. The release of relay 112 is followed by the release of the L1 relay 113. Relay 113 upon releasing opens the locking circuit of the A relay 100 at the unattended office and such relay releases. With relay 100 released the audible alarms at the unattended office are disabled and the alarm sending circuits are enabled. With the key 130 still operated at the unattended office, the lamp 131 will now light as an indication to the maintenance man on his return that he neglected to transfer the alarms. As soon as relay 100 releases tone current from the source LTS is again transmitted to the alarm receiving station as an indication that the transfer of alarms has been effected.

Under normal conditions, if the office is attended or if no alarms exist while unattended, positive potential is applied over the tip conductor 200 of the trunk circuit and negative potential is applied over conductor 201. If dirt should get on a contact of one of the relays or a wire become broken or crossed to ground, or a fuse in the +130-volt supply become blown so that positive potential is not supplied over the tip conductor 200, the signal will be changed to the equivalent of operating the A0 alarm sending relay 210 and the alarm relay 610 will be operated in the alarm receiving station thereby causing the alarm lamp 620 to become lighted indicative of a second trial trouble recorder seizure. This informality will become apparent when the remote control alarm release feature is found to be ineffective upon the operation of the key 503.

If there is a similar trouble interference with the application of negative potential over the ring conductor 201 of the trunk circuit, the transmitted signal will be equivalent to that which occurs when the A4 alarm sending relay 214 is operated and the alarm relay 614 is operated in the alarm receiving station to light lamp 624 indicative of a permanent signal condition. If the permanent signal alarm circuit has been operated to ground any one of the conductors of the group 280 at the alarm sending circuits, the failure to transmit the proper tone signal will indicate a failure of the trunk conductors or of the alarm sending circuits.

If the trunk conductors 200 and 201 are severed or grounded or if the 48-volt fuse for the alarm sending circuits becomes blown to cause relay 203 to release and to open both trunk conductors, a distinctive signal is transmitted to the alarm receiving station which will indicate a failure of the trunk conductors or of the alarm sending circuits.

What is claimed is:

1. In a signaling system, an unattended office, an attended office, a normally closed trunk connecting said offices, a normally operated relay at said unattended office, equipment at said unattended office, a plurality of alarm controlling devices at said unattended office means to operate one or more of said devices responsive to troubles arising with respect to said equipment, such as power failures, blown fuses, permanent signals and circuit failures, locking circuits for said devices, means under the control of an operated device to transmit code pulses over said trunk, alarm apparatus at said attended office, means at said attended office responsive to said code pulses to selectively operate said alarm apparatus, an alarm release key at said attended office for opening said trunk to release said first relay, and delay means operable upon the release of said first relay to momentarily open said locking circuits to release the operated alarm controlling devices at the unattended office.

2. In a signaling system, an unattended office, an attended office, a trunk connecting said offices, equipment at said unattended office, a plurality of alarm controlling devices at said unattended office means to operate one or more of said devices responsive to troubles arising with respect to said equipment, such as power failures, blown fuses, permanent signals and circuit failures, relays operable under the control of operated ones of said devices, said relays arranged in an order of precedence commensurate with the importance of the troubles which cause the operation of said relays, chain circuits including contacts of said relays for transmitting codes of pulses over said trunk indicative of the operated relay having the highest order of preference, alarm apparatus at said attended office, means at said attended office responsive to said code pulses to selectively operate said alarm apparatus, and means under the control of said attended office to render operated ones of said relays effective to transmit code pulses in the order of their precedence.

3. In a signaling system, an unattended office, an attended office, a normally closed trunk connecting said offices, a normally operated relay at said unattended office, equipment at said unattended office, a plurality of alarm controlling devices at said unattended office means to operate one or more of said devices responsive to troubles arising with respect to said equipment, such as power failures, blown fuses, permanent signals and circuit failures, locking circuits for said devices, signal transmission relays operable under the control of operated ones of said devices, said relays arranged in an order of precedence commensurate with the importance of the troubles which cause the operation of said relays, chain circuits including contacts of said relays for transmitting codes of pulses over said trunk indicative of the operated relay having the highest order of preference, alarm apparatus at said attended office, means at said attended office responsive to said code pulses to selectively operate said alarm apparatus, an alarm release key at said attended office for opening said trunk circuit to release said first relay, and means controlled upon the release of said first relay to open said locking circuits only momentarily regardless of the length of time said trunk circuit is maintained opened.

4. In a signaling system, an unattended office, an attended office, a two-conductor trunk connecting said offices, a receiving relay connected in series with each of said conductors at said attended office, a plurality of signal transmission relays at said unattended office, sources of current of opposite polarity, means for operating said latter relays to selectively connect one or the other of said sources to one or the other or both of the conductors of said trunk to transmit code signals thereover to selectively operate said receiving relays, signals at said attended office, and means operable in response to said receiving relays for selectively operating said signals to indicate which one of said transmission relays has been operated.

5. In a signaling system, an unattended office, an attended office, a two-conductor trunk connecting said offices, a receiving relay connected in series with each of said conductors at said attended office, a plurality of signal transmission relays at said unattended office, sources of current of opposite polarity, means for operating said latter relays to selectively connect one or the other of said sources to one or the other or both of the conductors of said trunk to transmit code signals thereover to selectively operate said receiving relays, chain circuits extending from said trunk conductors over contacts of said transmission relays toward said sources to give said transmission relays a definite order of precedence when simultaneously operated to control the transmission of code signals, signals at said attended office, and means operable in response to said receiving relays for selectively operating said signals to indicate the operation of the preferred ones of said transmission relays.

6. In a signaling system, an unattended office, an attended office, a two-conductor trunk connecting said offices, a plurality of signal transmission relays at said unattended office, sources of current of opposite polarity, means for operating said relays to selectively connect one or the other of said sources to one or the other or both of the conductors of said trunk to transmit code signals thereover, one of said signals being indicatives of a normal condition when no transmission relays is operated and the others of said signals being indicative of alarm conditions when some one of said transmission relays is operated, receiving relays at said attended office selectively responsive to said code signals, audible alarms, means controlled by the response of said latter relays from a normal to an alarm signal condition for causing the operation of said audible alarms, alarm lamps, and means responsive to the operation of said receiving relays for selectively operating said lamps to indicate which of said transmission relays has been operated.

7. In a signaling system, an unattended office, an attended office, a two-conductor trunk circuit connecting said offices, a plurality of signal transmission relays at said unattended office, sources of current of opposite polarity, means for operating said relays to selectively connect one or the other of said sources to one or the other or both of the conductors of said trunk to transmit code signals thereover, a receiving relay connected in series with each of said conductors at said attended office and selectively reponsive to a code signal of either positive or negative polarity, a pair of auxiliary relays associated with each of said receiving relays and selectively operable in accordance with the response of the receiving relay to a positive or a negative code signal, a plurality of signal registering relays selectively operable in response to said two pairs of auxiliary relays, and lamp signals controllable by said registed relays indicative of which one of said transmission relays has been operated.

8. In a signaling system, an unattended office, an attended office, a two-conductor trunk connecting said offices, a plurality of signal transmission relays at said unattended office, sources of current of opposite polarity, means for operating said relays to selectively connects one or the other of said sources to one or the other or both of the conductors of said trunk to transmit code signals thereover, a receiving relay connected in series with each of said conductors at said attended office and selectively responsive to a code signal of either positive or negative polarity, a pair of auxiliary relays associated with each of said receiving relays and selectively operable in accordance with the response of the receiving relay to a positive or a negative code signal, a plurality of signal registering relays selectively operable in response to said two pairs of auxiliary relays, lamp signals controllable by said register relays indicative of which one of said transmission relays has been operated, and means responsive to the operation of a register relay for checking to determine if any of said auxiliary relays has erroneously operated.

9. In a signaling system, an unattended office, an attended office, a two-conductor trunk connecting said offices, a plurality of signal transmission relays at said unattended office, sources of current of opposite polarity, means for operating said relays to selectively connect one or the other of said sources to one or the other or both of the conductors of said trunk to transmit code signals thereover, one of said signals being indicative of a normal condition when no transmission relay is operated and the others of said signals being indicative of alarm conditions when some one of said transmission relays is operated, a receiving relay connected in series with each of said conductors at said attended office and selectively responsive to a code signal of either positive or negative polarity, a pair of auxiliary relays associated with each of said receiving relays and selectively operable in accordance with the response of the receiving relay to a positive or a negative code signal, a relay normally operated under the joint control of said auxiliary relays when said auxiliary relays are selectively operated in response to a normal code signal, and audible alarms operable under the control of said relay when said auxiliary relays are selectively operated in response to a change from a normal code signal to an alarm code signal.

10. In a signaling system, an unattended office, an attended office, a two-conductor trunk connecting said offices, a plurality of signal transmission relays at said unattended office, sources of current of opposite polarity, means for operating said relays to selectively connect one or the other of said sources to one or the other or both of the conductors of said trunk to transmit code signals thereover, a receiving relay connected in series with each of said conductors at said attended office and selectively responsive to a code signal of either positive or negative polarity, a pair of auxiliary relays associated with each of said receiving relays and selectively operable in accordance with the response of the receiving relays to a positive or a negative code signal, a plurality of signal registering relays selectively operable in response to said two pairs of auxiliary relays, lamp signals controlled by said register relays indicative of which one of said transmission relays has been operated, a check relay operable under the joint control of said auxiliary relays and said operated register relay, and a slow-to-release relay controlled by said check relay for preventing the false operation of another register relay upon the release of said check relay when said auxiliary relays are reoperated in a different combination upon the changeover from one code signal to another.

11. In a signaling system, an unattended office, an attended office, a two-conductor trunk connecting said offices, a plurality of signal transmission relays at said unattended office, sources of current of opposite polarity, means for operating said relays to selectively connect one or the other of said sources to one or the other or both of the conductors of said trunk to transmit code signals thereover, a receiving relay connected in series with each of said conductors at said attended office and selectively responsive to a code signal of either positive or negative polarity, a plurality of signal registering relays selectively operable in response to said receiving relays, lamp signals controlled by said register relays indicative of which one of said transmission relays has ben operated, locking circuits for said register relays, audible signals, means for causing the operation of said audible signals whenever any one of said lamp signals is operated, an alarm cutoff relay operable to open the locking circuits of said register relays and the operating circuits of said audible signals, and an alarm cut-off key operable to operate said cut-off relay to still said audible alarms and to enable the extinguishment of any lighted lamp signal as soon as the initial operating circuit of the operated register relay is opened under the control of said receiving relays.

12. In a signaling system, an unattended office, an attended office, a trunk connecting said offices, equipment at said unattended office, a plurality of alarm controlling devices at said unattended office means to operate one or more of said devices responsive to troubles arising with respect to said equipment, such as power failures, blown fuses, permanent signals and circuit failures, first relays operable under the control of operated ones of said devices for transmitting codes of pulses over said trunk in an order of precedence commensurate with the importance of the troubles which have arisen indicative of the general nature of the troubles, second relays operable under the control of said first relays in the same order of precedence as the transmission of said codes of pulses, a plurality of sources of tone current, means controlled by said latter relays for connecting selected ones of said tone sources to said trunk indicative of the specific nature of the troubles, visual signals at said attended office, means at said attended office responsive to said code pulses to selectively operate said signals, and means at said attended office responsive to said tone currents.

13. In a signaling system, an unattended office, an attended office, a trunk connecting said offices, equipment at said unattended office, a plurality of alarm controlling devices at said unattended office means to operate one or more of said devices responsive to troubles arising with respect to said equipment, such as power failures, blown fuses, permanent signal and circuit failures, first relays operable under the control of said devices in an order of precedence commensurate with the importance of the troubles which have arisen, a plurality of sources of tone current, second relays operable under the control of any one of said first relays for connecting said tone sources with said trunk circuit in an order of precedence commensurate with the specific nature of the troubles, and means at said attended office responsive to said tone currents.

14. In a signaling system, an unattended office, an attended office, a trunk connecting said offices, equipment at said unattended office, a plurality of alarm controlling devices at said unattended office means to operate one or more of said devices responsive to troubles arising with respect to said equipment, such as power failures, blown fuses, permanent signals and circuit failures, audible alarms controlled by said devices, means under the control of an operated device to transmit over said trunk code pulses indicative of the general nature of the trouble and a tone signal indicative of the specific nature of the trouble, visual signals at said attended office, means at said attended office responsive to said code pulses to selectively operate said signals, means at said attended office responsive to said tone signal, and means at said unattended office to render said audible alarms effective and to render said transmitting means ineffective, in order to change said unattended office from an unattended to an attended status.

15. In a signaling system, an unattended office, an attended office, a trunk connecting said offices, equipment at said unattended office, a plurality of alarm controlling devices at said unattended office means to operate one or more of said devices responsive to troubles arising with respect to said equipment, such as power failures, blown fuses, permanent signals and circuit failures, audible alarms controlled by said devices, means under the control of an operated device to transmit over said trunk code pulses indicative of the general nature of the trouble and a tone signal indicative of the specific nature of the trouble, visual signals at said attended office, means at said attended office responsive to said code pulses to selectively operate said signals, means at said attended office responsive to said tone signals, means at said unattended office to render said audible alarms effective and to render said transmitting means, in order ineffective to change said unattended office from an unattended to an attended status, and means controlled from said attended office to return said unattended office to the unattended status.

16. In a telephone system, an unattended office, an attended office, a trunk connecting said offices, equipment at said unattended office, a plurality of alarm controlling devices at said unattended office means to operate one or more of said devices responsive to troubles arising with respect to said equipment, such as power failures, blown fuses, permanent signals and circuit failures, a plurality of sources of tone current, interrupter relays operable at different rates for producing intermittent signals from said sources of tone current, a plurality of relays controlled from said devices in accordance with the nature of the troubles which have arisen for controlling the operation of said interrupter relays and for applying signals to said trunk directly from said sources of tone current or as modified by said interrupter relays and means at said attended office responsive to said tone signals.

17. In a signaling system, an unattended office, an attended office, a trunk connecting said offices, equipment at said unattended office, a plurality of alarm controlling devices at said unattended office means to operate one or more of said devices responsive to troubles arising with respect to said equipment, such as power failures, blown fuses, permanent signals and circuit failures, a plurality of click generating circuits each comprising a condenser, a source of current and an interrupter, an interrupter relay for producing intermittent signals from said generated clicks, a plurality of relays controlled from said devices in accordance with the nature of the troubles which have arisen for controlling the operation of said interrupter relay and for establishing charging and discharging paths for said condensers extending over said trunk, whereby series of clicks generated at a plurality of different rates may be transmitted over said trunk to produce steady or interrupted click signals, and means at said attended office responsive to said signals.

18. In a telephone system, an unattended office, an attended office, a trunk connecting said offices, equipment at said unattended office, a plurality of alarm controlling devices at said unattended office means to operate one or more of said devices responsive to troubles arising with respect to said equipment, such as power failures, blown fuses, permanent signals and circuit failures, a plurality of sources of tone current, a plurality of click generating circuits each comprising a condenser, a source of current and an interrupter, interrupter relays operable at different rates for producing intermittent signals from said tone sources or from said generated clicks, a plurality of relays controlled from said devices in accordance with the nature of the troubles which have arisen for controlling the operation of said interrupter relays, for applying signals to said trunk directly from said sources of tone current or as modified by said interrupter relays, or for establishing charging and discharging paths over said trunk for said condensers whereby series of clicks generated at a plurality of different rates may be transmitted over said trunk to produce steady or interrupted click signals, and means at said attended office responsive to any of said signals.

CHARLES E. GERMANTON.

REFERENCES CITED

The following references are of record in the file of this patent:

UNITED STATES PATENTS

| Number | Name | Date |
|---|---|---|
| 1,569,678 | Powell | Jan. 12, 1926 |
| 1,610,346 | Willis | Dec. 4, 1926 |
| 1,616,738 | Benson | Feb. 8, 1927 |
| 1,708,946 | Hovland | Apr. 16, 1929 |
| 1,805,726 | Saunders | May 19, 1931 |
| 1,899,112 | Saunders et al. | Feb. 28, 1933 |
| 1,912,450 | Hatton et al. | June 6, 1933 |
| 2,262,595 | Walters | Nov. 11, 1941 |
| 2,268,635 | Baumfalk | Jan. 6, 1942 |

FOREIGN PATENTS

| Number | Country | Date |
|---|---|---|
| 391,857 | Great Britain | May 8, 1933 |